United States Patent
Wheeler et al.

(10) Patent No.: US 10,430,851 B2
(45) Date of Patent: Oct. 1, 2019

(54) PERIPHERAL DEVICE CUSTOMIZATION

(71) Applicant: Microsoft Technology Licensing, LLC, Redmond, WA (US)

(72) Inventors: Joseph Wheeler, Sammamish, WA (US); Craig R. Maitlen, Woodinville, WA (US); Devin Brown, Bothell, WA (US); Jurgen Brenkert, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 296 days.

(21) Appl. No.: 15/398,597

(22) Filed: Jan. 4, 2017

(65) Prior Publication Data

US 2017/0358021 A1    Dec. 14, 2017

Related U.S. Application Data

(60) Provisional application No. 62/348,107, filed on Jun. 9, 2016.

(51) Int. Cl.
*G06Q 30/00* (2012.01)
*G06Q 30/06* (2012.01)
(Continued)

(52) U.S. Cl.
CPC ....... *G06Q 30/0621* (2013.01); *G06F 16/248* (2019.01); *G06F 16/5838* (2019.01); *G06F 16/9535* (2019.01); *G06Q 30/0627* (2013.01)

(58) Field of Classification Search
CPC ............ G06Q 30/0621; G06Q 30/0627; G06F 17/3025; G06F 17/30554; G06F 17/30867
(Continued)

(56) References Cited

U.S. PATENT DOCUMENTS 6,085,126 A    7/2000  Mellgren et al.
6,300,595 B1  10/2001  Williams
(Continued)

FOREIGN PATENT DOCUMENTS

GB    2506707 A   *  4/2014  ........... G06T 11/001
KR    2009-L88411  *  7/2009  ............. G06T 17/00

OTHER PUBLICATIONS

Article published on Aug. 5, 2015:, "Internet Information Provider Companies; Patent Issued for Learning Semantic Image Similarity Journal of Engineering [Atlanta] Aug. 5, 2015: 4114"; extracted from ProQuest Dialog search on Dec. 30, 2018.*

(Continued)

*Primary Examiner* — Yogesh C Garg
(74) *Attorney, Agent, or Firm* — Alleman Hall Creasman & Tuttle LLP

(57) ABSTRACT

A computing system for managing product customization is provided. The computing system includes instructions stored in memory and executable by a processor to receive, for each of a plurality of parts of a 3D product, a color selection input specifying a color selected by a user for that part, responsive to receiving the color selection inputs, generate a color histogram of the 3D product including a plurality of units, each unit being associated with one of the parts and assigned the color of that part, where the number of units allocated to each part is based on a size of the part, and display the color histogram in a graphical user interface.

17 Claims, 8 Drawing Sheets

(51) Int. Cl.
*G06F 16/248* (2019.01)
*G06F 16/583* (2019.01)
*G06F 16/9535* (2019.01)

(58) Field of Classification Search
USPC .................................. 705/26.1, 26.63, 26.65
See application file for complete search history.

(56) References Cited

U.S. PATENT DOCUMENTS

| | | | |
|---|---|---|---|
| 7,069,108 B2 | 6/2006 | Saarela et al. | |
| 8,049,766 B2* | 11/2011 | Fisher | G06Q 30/02 345/157 |
| 9,460,557 B1* | 10/2016 | Tran | B29C 64/386 |
| 2005/0030588 A1 | 2/2005 | Reese et al. | |
| 2007/0060346 A1 | 3/2007 | Edwards | |
| 2007/0070468 A1 | 3/2007 | Ogawa | |
| 2008/0178088 A1 | 7/2008 | Goldstein et al. | |
| 2009/0122329 A1 | 5/2009 | Hegemier et al. | |
| 2010/0169059 A1 | 7/2010 | Thomas-Lepore et al. | |
| 2011/0268320 A1* | 11/2011 | Huang | G06K 9/00718 382/103 |
| 2014/0096009 A1* | 4/2014 | Grosz | G06F 3/1242 715/733 |
| 2015/0379738 A1* | 12/2015 | Gunningham | G06T 11/001 345/600 |
| 2016/0092592 A1* | 3/2016 | Bates | G06Q 30/0601 715/240 |

OTHER PUBLICATIONS

"In a Flash Laser", Retrieved on: Jun. 17, 2016 Available at: http://ipadlaserengraving.com/.

"Phone, iPad, Tablet and Personal Electronic Engraving with a Laser", Published on: Jun. 19, 2014 Available at: https://www.epiloglaser.com/how-it-works/applications/electronics-laser-engraving.htm.

"iPhone Laser Engraving", Published on: Jan. 2, 2016 Available at: http://www.or-laser.com/en/facts-laser-applications/iphone-laser-engraving/.

* cited by examiner

PERIPHERAL DEVICE CUSTOMIZATION

CROSS-REFERENCE TO RELATED APPLICATIONS

The present application claims priority to U.S. Provisional Patent Application No. 62/348,107 entitled "PERIPHERAL DEVICE CUSTOMIZATION", filed Jun. 9, 2016, the entire contents of each of which are hereby incorporated by reference for all purposes.

BACKGROUND

Online platforms increasingly are providing consumers with the ability to virtually customize product designs (e.g., select a color scheme) for viewing on a desktop computer, tablet, smart phone, etc. One example is the ability to select colors for different parts of an athletic shoe. However, even with this ability, consumers for various reasons may have difficulty arriving at a design that is visually pleasing or otherwise fully reflects their preferences. Colors may be selected that do not complement one another well; provide too much or too little contrast; cover too much or too little of the product; that are spatially distributed in a way that diminishes visual appeal; etc. Moreover, even with a desirable design, it may be difficult for the consumer to holistically understand what they have designed, or to communicate its character in a useful way to others.

DETAILED DESCRIPTION

This description discloses systems and methods that enable a product design to be quickly and efficiently realized through user-selected colors, and that enable the design be displayed and represented in a unique and meaningful way. Although the embodiments described herein involve the customization of gaming controllers, the customization of a wide range of other products is within the scope of this disclosure. For example, the color customization techniques described herein may be applied to consumer electronics, furniture, vehicles, clothing, footwear, etc. The systems and methods enable a custom color design to be expressed through a graphical color histogram. The histogram provides a color overview of a consumer-selected product design that acts as a design fingerprint. This fingerprint can facilitate rapid design comparison and differentiation. Color histogram characteristics can also be leveraged by search tools to enable searching a multitude of related custom designs. The search results returning related custom color designs can provide design ideas to the user which may be selected as alternates to their initial design, inspire further/different customization by the user, or serve as a basis for further searching. Using color histograms for search can also increase search efficiency and reduce delays when returning search results. Another efficiency aspect is the histogram mechanism's ability to return valuable search results that would not be obtained absent use of the histogram. The increased search efficiency is achieved by utilizing the histogram's organized data structure and quantified product characteristics for rapid search processing. The visual characteristics of the color histogram may include linearly arranged units with assigned colors and product parts. The units may be weighted such that each product part is assigned a predetermined number of units. Text labeling of the colors and part names may also be presented in the color histogram, providing consumers with a common descriptive framework for discussions involving customized products. The aforementioned benefits can greatly enhance a user's ability to design and select pleasing product customizations.

Figure 1:
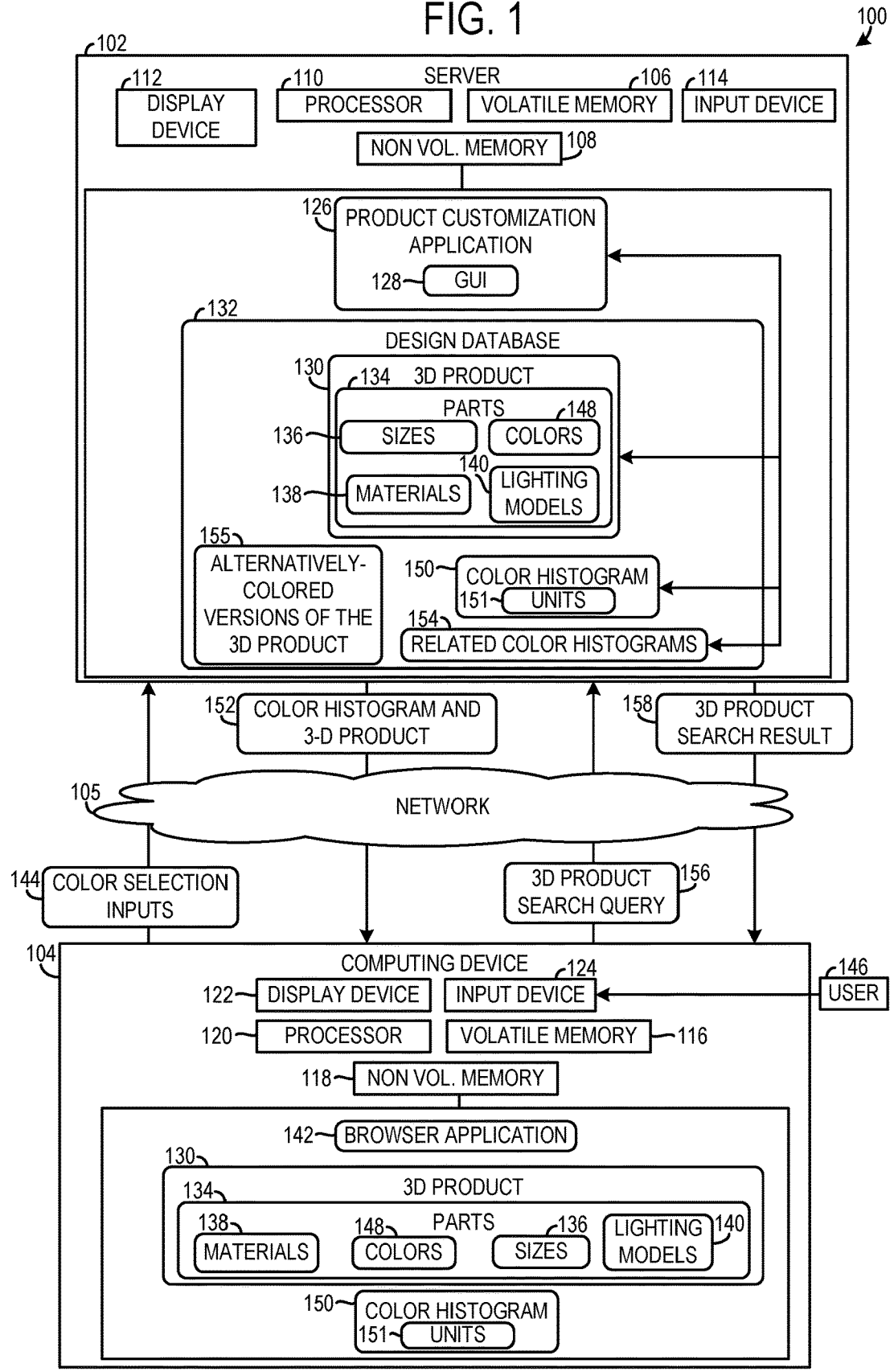
FIG. 1 shows a schematic depiction of a computing system including a computing device and a server configured for product color customization.

FIG. 1 schematically depicts a computing system 100 that may be used to manage product customization and the generation of color histograms related to customized products. Computing system 100 includes a server 102 and a computing device 104. The computing device 104 and the server 102 may be configured to electronically communicate over any type of network 105 (such as the Internet, a wide area network (WAN), local area network (LAN), etc.).

As indicated, the server 102 may include a volatile memory 106, non-volatile memory 108 (e.g., mass storage), a processor 110, a display device 112, and an input device 114 (e.g., keyboard, touch-screen, mouse, etc.). In typical implementations, the server 102 will be a server that manages a web-based product customization platform, and accordingly need not include one or more of the above-listed components (for example, servers often do not include display or input devices). The computing device 104 may include similar components—i.e., a volatile memory 116, non-volatile memory 118, a processor 120, a display device 122, and an input device 124. It will be appreciated that instructions as described herein may be stored in volatile memory, such as volatile memory 106 and 116, and/or may be stored in non-volatile memory, such as non-volatile memory 108 and 118. The instructions may include the steps, functions, etc., described in greater detail herein.

The server 102 may also include a product customization application 126 enabling consumers to remotely customize products on a network-based (e.g., web-based) platform. The product customization application 126 may therefore include at least some of the product customization and search instructions (e.g., steps, functions, etc.,) described herein, in one example. The product customization application 126 is configured to render a graphical user interface (GUI) 128 in which custom colors can be chosen for selected parts of a 3D product 130. The 3D product 130 may be stored in a design database 132. The 3D product 130 can be thought of as a virtual mock-up of a hypothetical physical product that a user may choose to purchase. The 3D product 130 includes a plurality of parts 134. In one example, the product customization application 126 may be configured to dynamically render the 3D product 130 including the plurality of parts 134. In this example, the 3D product 130 may be rendered at different viewing angles to enable a consumer to view the entirety of the 3D product. In the case of a gaming controller, the parts may include body, back case, bumpers and triggers, directional pad, thumbsticks, ABXY, and V & M. However, any conceivable consumer product parts have been contemplated. Each of the plurality of parts 134 has a designated size 136 (e.g., viewable surface area, volume, etc.). Each of the plurality of parts may optionally also have a material 138, and lighting model 140. Each of the lighting models 140 may correspond to the different materials used to construct the product. For example, one lighting model may be designated for brushed aluminum while another lighting model may be designated for high density polyethylene (HDPE). The lighting models 140 may each define a texture, refraction, and/or reflection of the corresponding part. In this way, a sophisticated representation of the 3D product can be rendered with accurate and appealing visual characteristics, if desired.

The computing device 104 is also configured to execute a network browser application 142 enabling a user to remotely control the product customization application 126 and corresponding 3D product 130. The computing device 104 can therefore access and view the 3D product 130 rendered by the product customization application 126. It will be appreciated that in other embodiments a consumer may access the product customization application 126 and the 3D product 130 using a single computing device. Specifically in such an embodiment, the computing device 104 may include the product customization application 126 and design database 132 and may be configured to implement at least a portion of the product customization features of the server 102, described herein.

In one example, the computing device 104 may generate a plurality of color selection inputs and send the color selection inputs 144 to the product customization application 126 in the server 102. The color selection inputs 144 may be generated in response to interactions of a user 146 with the input device 124. Each of the color selection inputs 144 may specify a color assigned to one of the plurality of parts 134 of the 3D product 130. For instance, a color palette may be presented adjacent to each of the plurality of parts 134 of the 3D product 130 when the user 146 accesses the 3D product through the product customization application 126. A user may select one of a plurality of color choices in each color palette to assign a color to each part in the 3D product. In this way, the user can designate colors for the different parts of the 3D product 130. If the user does not select colors for all of the parts, parts of the 3D product may be rendered with predefined colors. For instance, parts of the 3D product may have a predefined default color (e.g., white, grey, black, etc.). However in other examples, each of the plurality of parts 134 may have a user assigned color. The user assigned colors 148 are stored in the 3D product 130.

Figure 3:
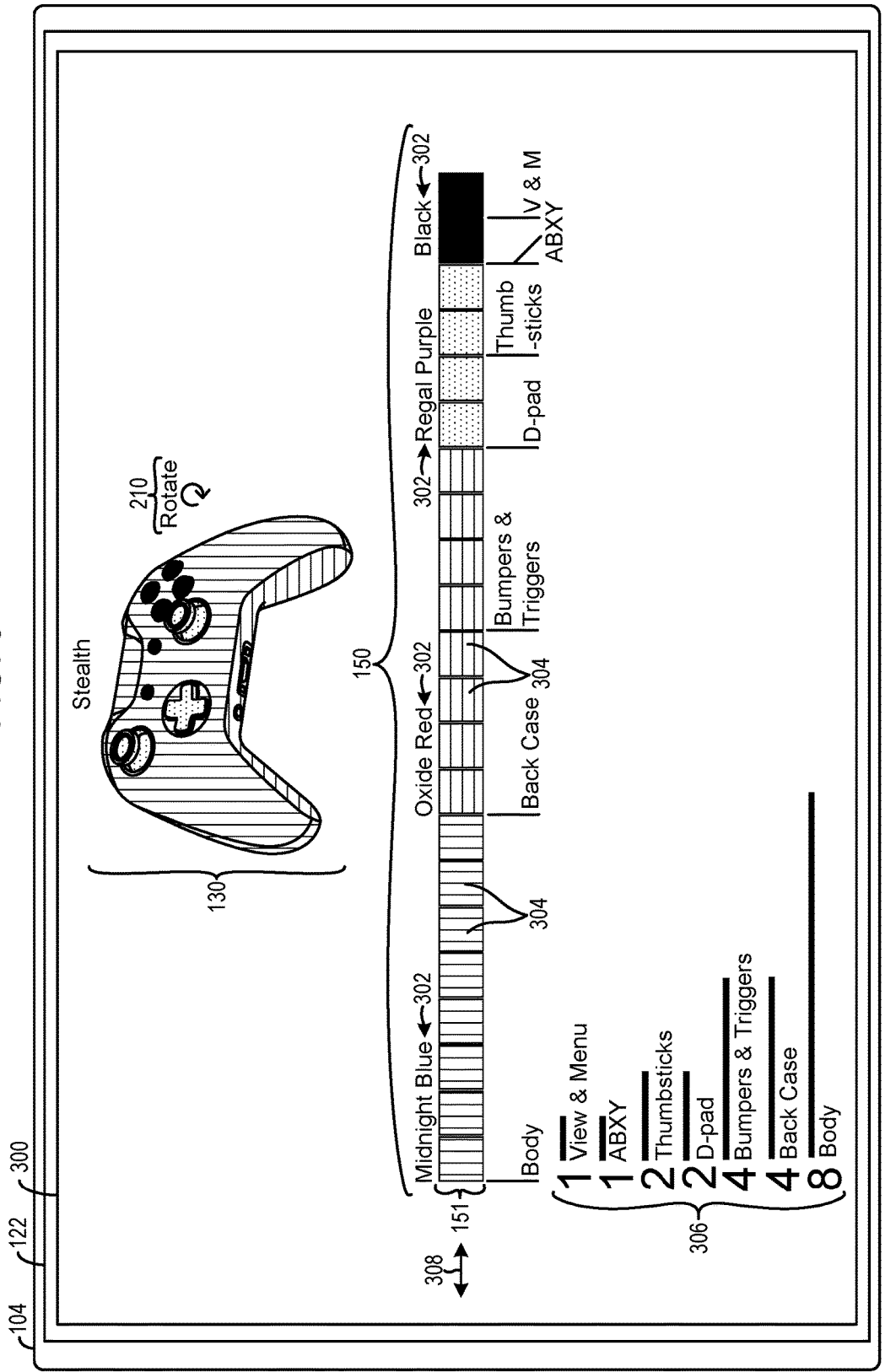
FIG. 3 shows another GUI presented on the display device of the computing device, shown in FIG. 1, with a color histogram and a 3D product colored based on the color choices selected through the GUI shown in FIG. 2.
Figure 4:
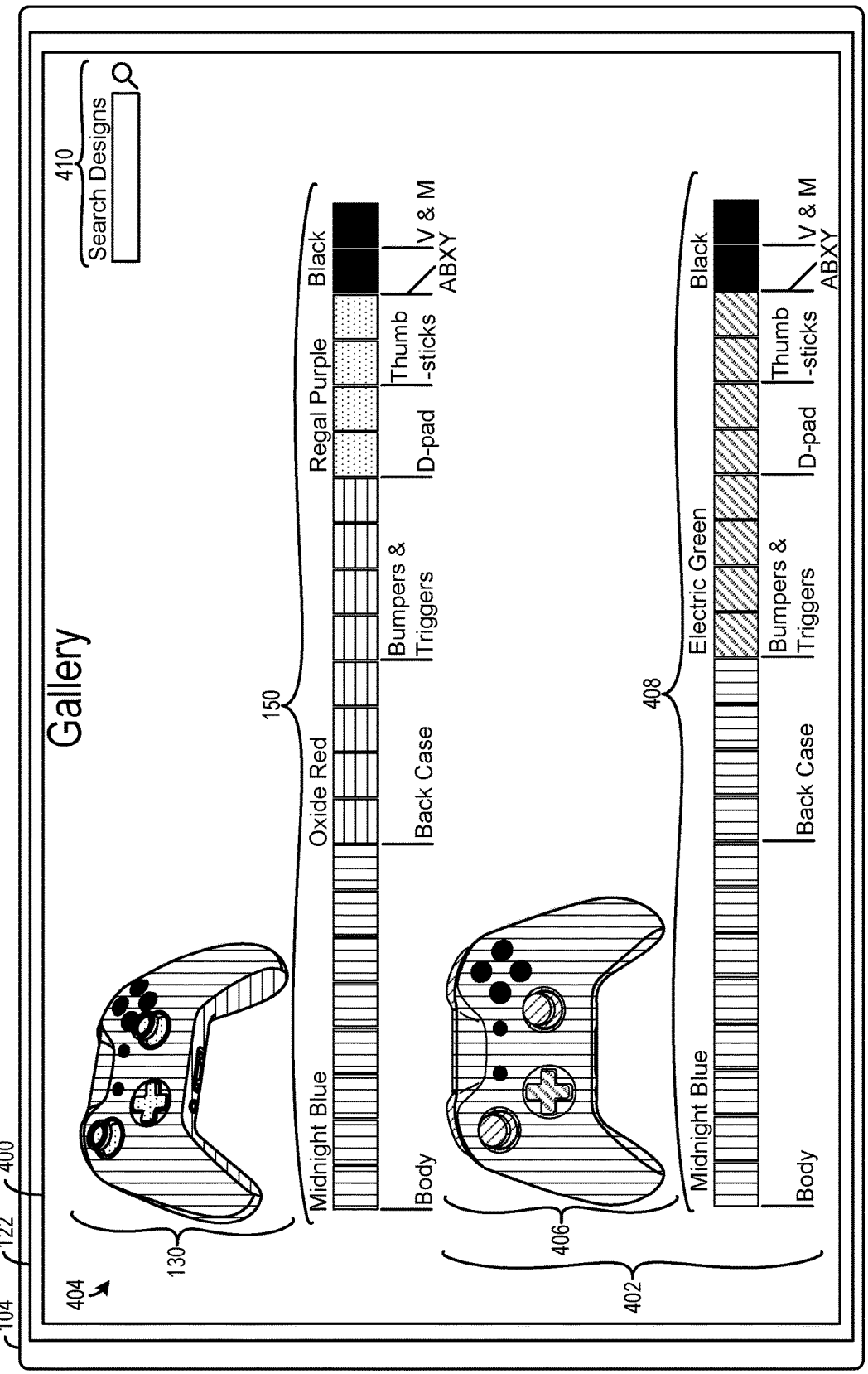
FIG. 4 shows another GUI presented on the display device of the computing device, shown in FIG. 1, with a 3D product search result.

In response to receiving the color selection inputs 144 the product customization application 126 executed by the server 102 may generate the 3D product 130 with the user selected colors. Additionally, a color histogram 150 of the 3D product 130 may also be generated by the product customization application 126 executed by the server 102 in response to receiving the color selection inputs 144. The color histogram 150 provides an overview of a product's color design. Specifically, the color histogram 150 may include units 151 designating the amount of color used in different parts of the product. Specifically, the number of units allocated to each part of the 3D product may be allocated based on the size (e.g., weighted surface area) of the part. Thus, the color histogram 150 acts as an identifier of a custom product design, enabling quick and easy design differentiation. The specific graphical features of the color histogram 150 are shown in FIGS. 3-4 and discussed in greater detail herein. Indicated at 152, both the color histogram and the 3D product with the user selected colors are sent from the server 102 to the computing device 104 in response to generation of the color histogram 150 at the server 102. However in other examples, the color histogram and the 3D product 130 may be sent from the server 102 to the computing device 104 at different time intervals. In some implementations, the 3D product 130 including the plurality of parts 134 with assigned colors 148, sizes 136, materials 138, and lighting models 140, as well as the color histogram 150 with the plurality of units 151, may be stored on the computing device 104 in addition to or as an alternative to being stored on the server 102.

Related color histograms 154 generated by the user of the computing device 104 or other users of other computing devices may be stored in the design database 132. The related color histograms 154 are histograms representing other customized product designs of the 3D product 130 (i.e., alternatively-colored versions of the 3D product). For instance, other users can access the product customization application 126 or other similar product customization applications to generate different customized color designs of the 3D product 130. As such, a large number of custom designs for a common 3D product can be stored in the design database 132. It will be appreciated that each of the related color histograms 154 has a corresponding alternatively-colored version 155 of the 3D product stored in the design database 132. The related color histograms may be used to return search results of different versions of the 3D product for user comparison.

A 3D product search query 156 may be sent from the computing device 104 to the server 102. In one example, the 3D product search query 156 may be automatically generated based on and in response to generation of the color histogram 150. For instance, the 3D product search query 156 may be automatically generated by the computing device 104 when the user assigns customized colors to the 3D product 130. However in other examples, the 3D product search query 156 may be generated responsive to reception of a keyword input from the user 146. For instance, a user may search for a custom color they are interested in such as "oxide red" or "midnight blue". As such, the 3D product search query 156 may be a request for customized 3D products related to a customized 3D product generated by the user.

In response to receiving the 3D product search query 156 the server 102 may generate and send a 3D product search result 158 to the computing device 104. The computing device 104 may then display the 3D product search result 158. The generation, sending, and/or displaying of the 3D product search result 158 may be included in a general step of returning the 3D product search result. The 3D product search result 158 may include a selected group of the plurality of multiple alternatively-colored versions the 3D product 155. It will be appreciated that the selected group may include a single alternatively-colored version of the 3D product or a plurality of alternatively-colored versions of the 3D product. The related color histograms 154 corresponding to the alternatively-colored versions of the 3D product may be used to generate the 3D product search result. For instance, aspects of the related color histograms 154 such as the number of units having a specified assigned color may be taken into account when selecting alternatively-colored versions of the 3D product for the search results. The 3D product search result 158 provides the user with product designs related to the customized color design they have created, for comparison. The comparison may give the user design ideas and spark inspiration to improve upon their custom design. Furthermore, using color histograms in a search tool can increase searching efficiency and reduce delays when returning search results by taking advantage of the color histogram's underlying organized data structure with quantified product characteristics that can be quickly processed. Detailed examples of the 3D product search results 158 are illustrated in FIGS. 4 and 5 and discussed in greater detail herein.

Figure 2:
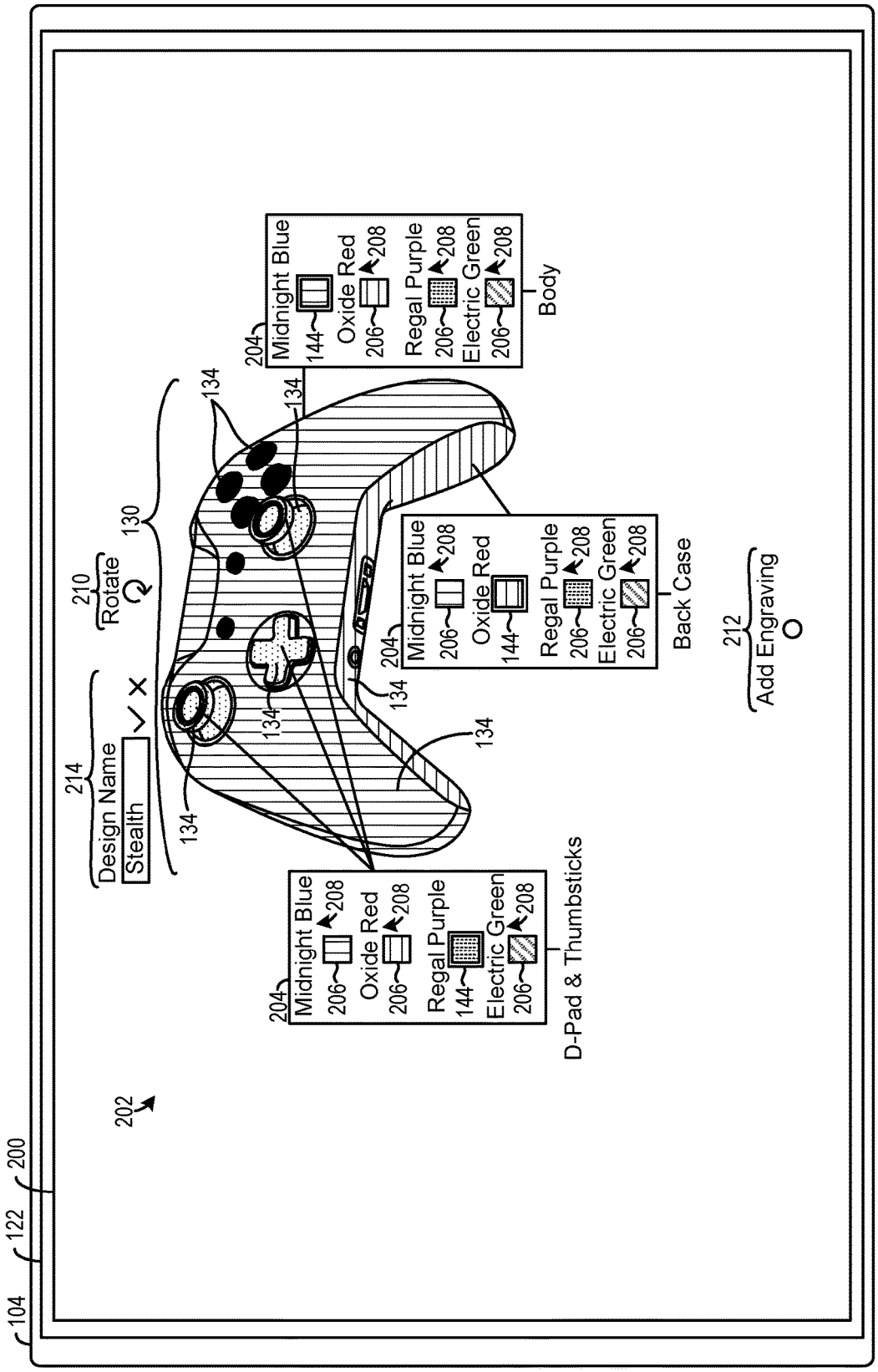
FIG. 2 shows a graphical user interface (GUI) for product color selection presented on a display device of the computing device, shown in FIG. 1.
Figure 5:
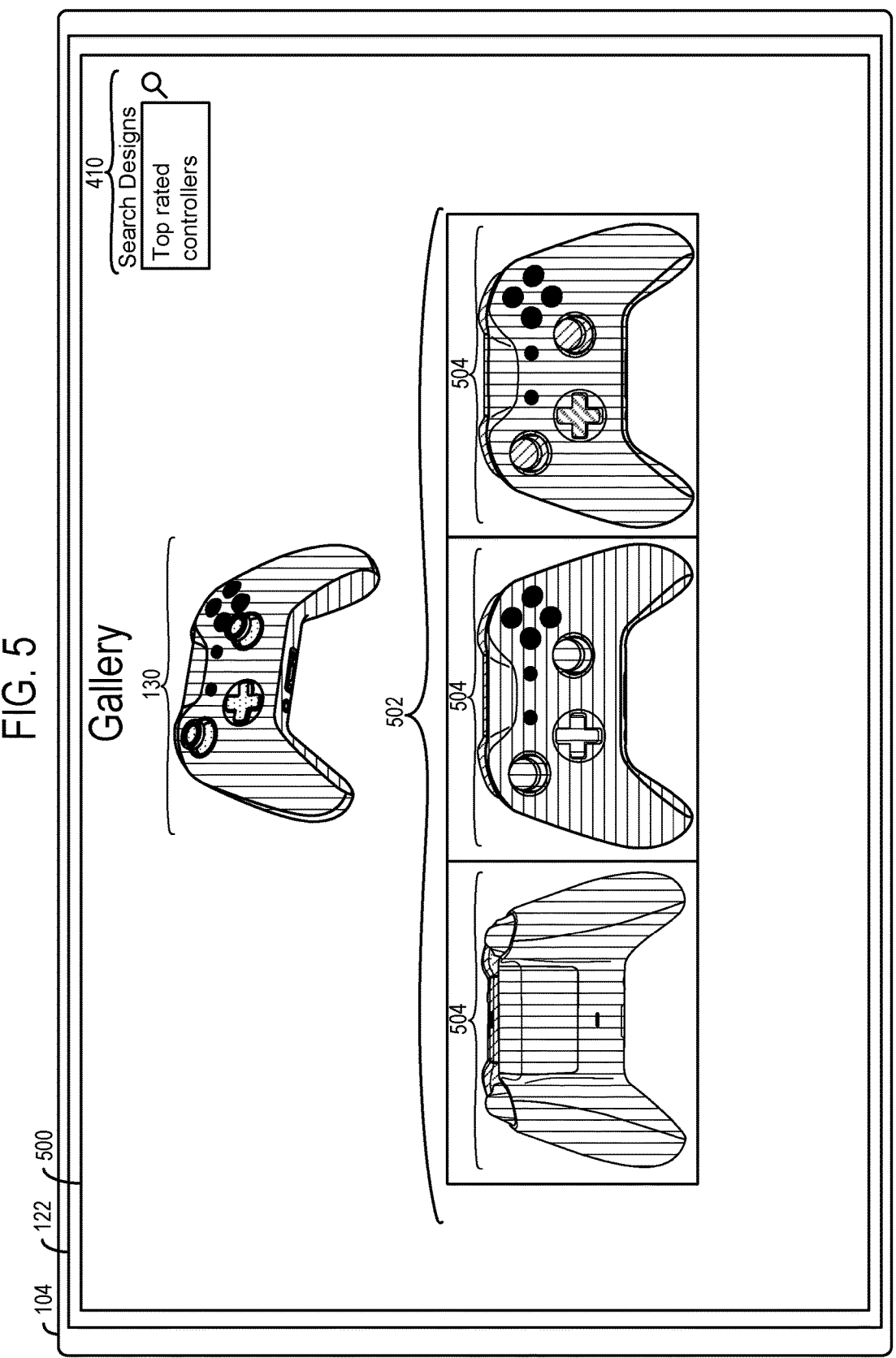
FIG. 5 shows another GUI presented on the display device of the computing device, shown in FIG. 1, with another 3D product search result.

FIGS. 2-5 shows different GUIs 200, 300, 400, and 500 respectively, presented on the display device 122 of the computing device 104. FIG. 2 specifically shows a product color customization interface 202 allowing users to assign colors to parts of the 3D product 130. FIG. 3 shows the customized 3D product 130 with the colors designated in the GUI 200, shown in FIG. 2, with an associated color histogram 150. FIGS. 4 and 5 show GUIs with different 3D product search results that may be returned in response to a 3D product search query.

Referring to FIG. 2, the 3D product 130 is presented in the GUI 200. The 3D product 130 includes the plurality of parts 134. In the depicted example, the 3D product is a controller and the plurality of parts include a body, back case, bumpers and triggers, directional pad, thumbsticks, ABXY, and V & M. However, numerous parts delineating sections of the 3D product have been contemplated.

In the depicted embodiment, color palettes 204 are shown including a plurality of color choices delineated by tiles 206 and corresponding text 208. However, a variety of different ways of representing color choices have been contemplated. The color choices may also be presented as a drop down box, a color wheel, etc.

The user can trigger generation of the plurality of color selection inputs 144 indicating a color assigned to a specific part of the 3D product 130. In the depicted embodiment, a user may select a tile via a mouse click, touch input, etc., and in response a color selection input is generated. In response to receiving each of the plurality of color selection inputs 144 the selected color is assigned to the corresponding part and filled with the selected color.

A rotation input tool 210 may also be provided in the GUI 200 to enable the user to rotate the 3D product 130. As such, the 3D product 130 may be dynamically rotated. An engraving tool 212 may also be provided in the GUI 200 to enable the user to add an engraving to the 3D product 130, for further product customization. A design naming tool 214 configured to allow the user to name their customized 3D product may also be provided in the GUI 200.

Turning now to FIG. 3, the illustrated color histogram 150 may also be generated in response to receiving the plurality of color selection inputs 144, depicted in FIG. 2. In FIG. 3, the color histogram 150 includes the plurality of units 151. Each of the plurality of units 151 has an assigned color and part, indicated with text 302 and hue 304, indicated via the illustrated line hatching. The parts may be assigned different numbers of units based on the size (e.g., weighted surface area) of the part. In the depicted embodiment, the body is assigned 8 units, the back case is assigned 4 units, etc. Text and other graphics 306 indicating the number of units assigned to each part may also be provided in the color histogram 150. In this way, users are provided with quantified design characteristics of the custom colored 3D product.

In the illustrated embodiment, the units are linearly arranged along an axis 308. However, other unit arrangements have been contemplated. For instance, units having matching colors may be arranged in separate rows or columns.

The units 151 in the color histogram 150 may be sorted according to a double sort technique. In the double sort operation the units may first be sorted by color such that similarly colored units are adjacent to each other. In the depicted example, blue, red, purple, and black units are grouped together. Subsequently, the units 151 may be sorted based on the number of units assigned to the parts having corresponding colors. For instance, units having common colors may then be sorted on a part by part basis from largest part to smallest part or smallest part to largest part in a sequential manner. As such, the color histogram 151 may have underlying sorting data representing the two levels of sorting. Additionally, the rotation input tool 210 may also be provided in the GUI 300 to again enable the user to rotate the 3D product 130.

FIG. 4 shows an exemplary 3D product search result 402 returned in a gallery 404 of the GUI 400. As discussed, the 3D product search query prompting generation of the 3D product search result 402 may be automatically generated. The 3D product search result 402 may include an alternately-colored version of the 3D product 406 with an associated a color histogram 408 that correlates with the color histogram 150 of the 3D product 130. A correlation between color histograms may denote a match between units with corresponding parts and color designations in each of the color histograms. In other examples, a correlation between color histograms may signify an equivalent number of units with matching color designations in each of the color histograms. In yet another example, a correlation between color histograms may denote an overlapping range of units with matching color designations in each of the color histograms. For instance, two color histograms may be correlated when each of the histograms has between 4-8 units designated with a matching color. In such an example, a color histogram with 5 units of oxide red is correlated with a color histogram with 8 units of oxide red. In yet another example, a correlation between color histograms may denote the matching of two or more colors designated to units in the color histograms. Correlating the color histograms in this manner may increase search efficiency and reduce delays when returning search results. Specifically, the color histograms underlying data structure quantifying different aspects of the product can be leveraged for quick and efficient search processing with decreased delays and better results. For example, without the described histogram mechanism, other search methods may take longer to provide, for example, color schemes having color proportions or color attributes that the user would find appealing.

The 3D product search result 402 may also be returned based on other factors such as social network friends, design popularity (e.g., likes), previously determined personal preferences (e.g., favorite games, sports, etc.,) browsing history, online purchases, etc. For instance, an alternatively-colored version of the 3D product that is widely popular on a social networking site may be presented to the user in the search result. In another example, an alternatively-colored version of the 3D product with colors matching the logo a user's favorite sports team may be returned in the search result.

A search tool 410 is also provided in the GUI 400. The search tool 410 enables a user to enter a keyword input. The keyword input may prompt generation of a new or refined 3D product search query based on the keyword and the color histogram 150. A new or augmented 3D product search result may be returned based on the refined 3D product search results. For instance, the keyword input may be "robot white." The search results may therefore return 3D product versions having one or more parts colored robot white. Other exemplary keyword inputs may be a request for limited edition controllers or a request for controllers related to a popular movie or video game. For instance, a video game may be stylized with a distinct color palette. Therefore, when the keyword input is the video game's title, the game's distinctive color palette may be used in the search. In yet another example, keywords related to social connections, other products, seasons, etc., may be used in the 3D product search.

FIG. 5 shows another 3D product search result 502 in the GUI 500 that may be returned to a user based on a 3D product search query 501 (e.g., search keyword), entered into the search tool 410, in the depicted example. The 3D product search result 502 includes a plurality of alternately-colored versions 504 of the 3D product 130. It will be appreciated that color histograms of the plurality of alternately-colored versions 504 may correlate with color histogram 150 of the 3D product 130. The correlation between the color histograms may be ascertained using any of the previously mentioned correlation strategies. In FIG. 5 the color histograms associated with the different versions of the 3D product are not presented in the GUI 500. However the color histograms may be incorporated into the GUI 500 in other embodiments.

In one embodiment, the user may pick one of the alternatively-colored versions 504 of the 3D product presented in the 3D product search result 502. Responsive to the user selection of one of alternatively-colored versions 504 another 3D product search result may be returned. The 3D product search results may be refined based on the characteristics of the histogram associated with the selected alternatively-colored version of the 3D product. For instance, a user may pick a version of the 3D product with a large amount of yellow and green. As such, the refined search may lookup versions of the 3D product with green and/or yellow parts. Refining the search in this manner has the potential benefit of enabling a user to tune the search results based on their preferences.

Figure 6:
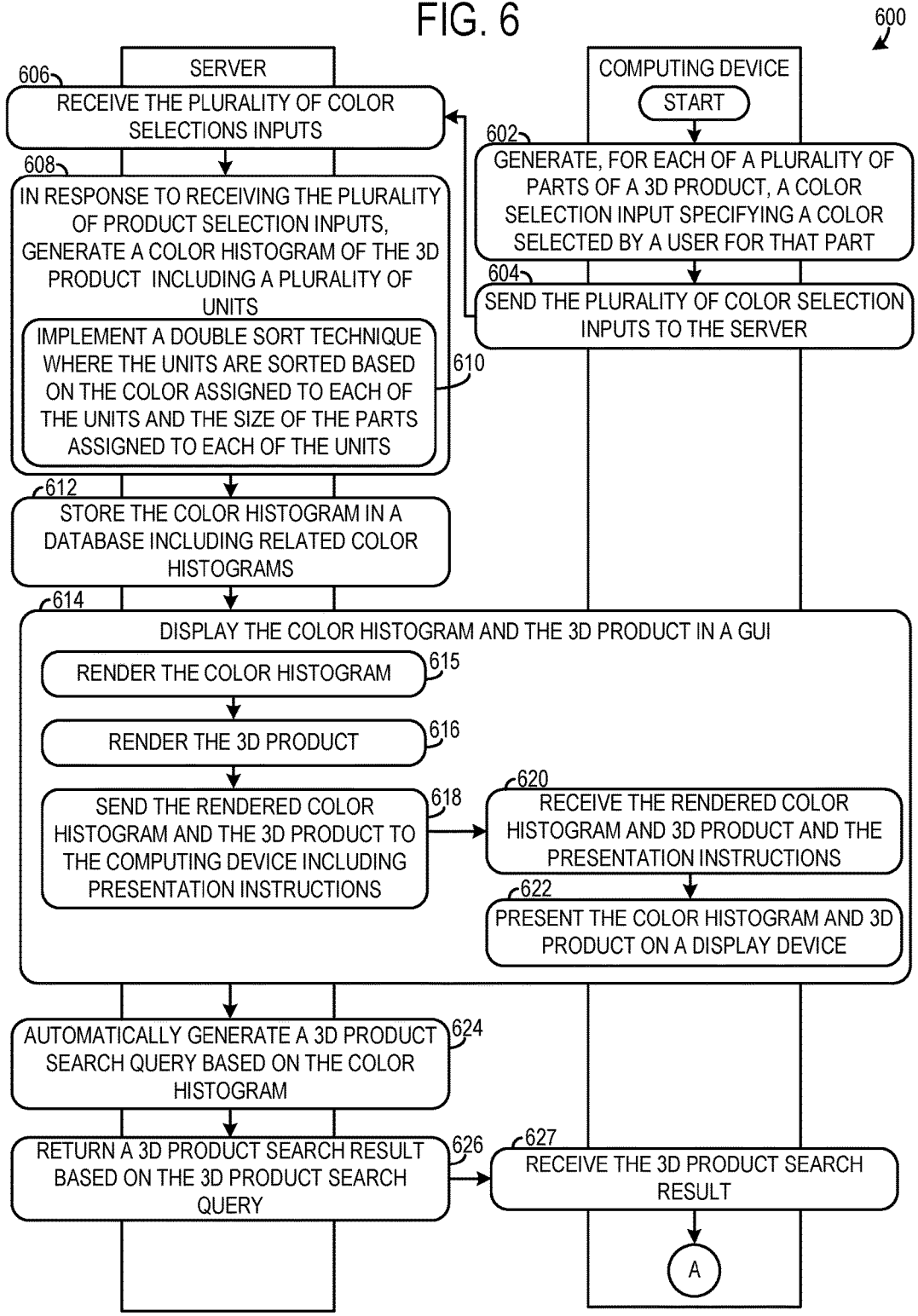
FIGS. 6-7 shows a method for managing product customization.
Figure 7:
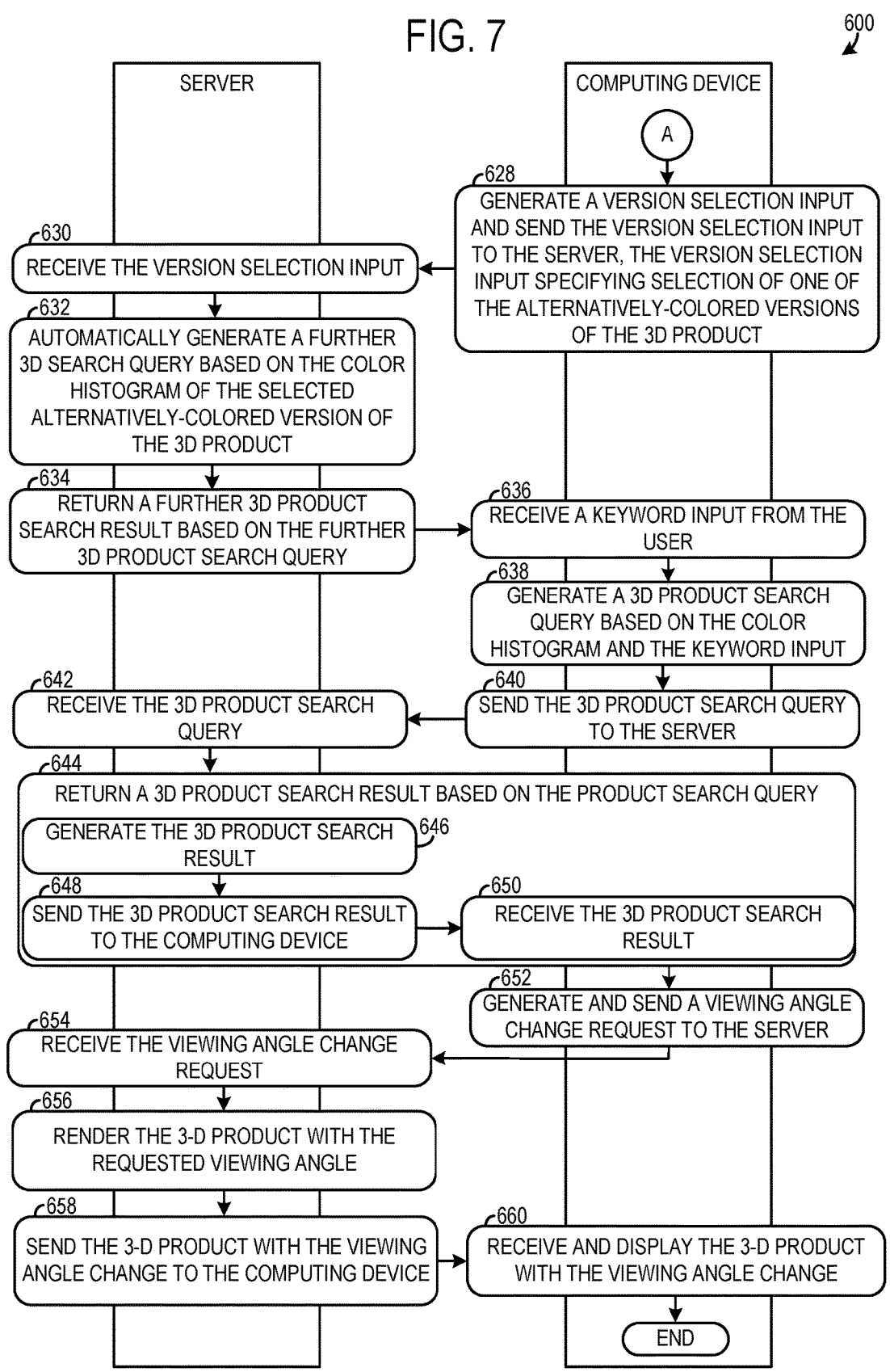

FIGS. 6-7 show a method 600 for managing product customization. Method 600 may be implemented through the computing system, server, and computing device described above with regard to FIGS. 1-5 or may be implemented through other suitable computing systems, servers, computing devices, etc.

Referring to FIG. 6, at 602 the method includes generating, for each of a plurality of parts of a 3D product, a color selection input specifying a color selected by a user for that part. For instance, for each product part, a user may select a color tile in a color palette, via mouse click or touch input, which corresponds to a selected part of a 3D product. The color selection inputs enable consumers to craft a custom design according to their personal predilections.

At 604 the method includes sending the plurality of color selection inputs to the server from the computing device. As previously discussed, the server and computing device may communicate over a network. Next at 606 the method includes receiving the plurality of color selection inputs at the server.

Moving to step 608, the method includes, in response to receiving the product selection input, generating a color histogram of the 3D product including a plurality of units. The color histogram provides an easily recognizable summary of the product's custom color choices.

Generating the color histogram may include at 610 implementing a double sort technique where the units are sorted based on the color assigned to each of the units and the size of the parts assigned to each of the units. As one example, the units may first be sorted according to the color assigned to the units. Thus, units with matching assigned colors may first be arranged next to one another. For instance, units with the color blue may be grouped together in a first section of the color histogram and units with the color green may be grouped together in a second section of the color histogram. Subsequently, the units in each of the color groups may be sorted according to the size of the parts. For instance, parts with matching colors may be arranged in ascending sizes (i.e., smallest to largest) or descending sizes (i.e., largest to smallest).

Advancing to step 612, the method includes storing the color histogram in a database including related color histograms. In this way, numerous custom product designs delineated via color histograms can be compiled in a database for downstream search. Thus, the database may include a plurality of color histograms representing different colored versions of the 3D product.

At 614 the method includes displaying the color histogram and the 3D product in a GUI. However, in other examples only the color histogram or the 3D product may be displayed in the GUI. Displaying the color histogram and the 3D product may include steps 615-622 or a portion of steps 615-622. For example, displaying the color histogram and the 3D product may only include step 618.

At 615 the method includes rendering the color histogram in the GUI and at 616 the method includes rendering the 3D product in the GUI.

Next at 618 the method includes sending the rendered color histogram and the 3D product to the computing device including presentation instructions. At 620 the method includes receiving the rendered color histogram, the 3D product, and the presentation instructions. Next at 622 the method includes presenting the color histogram and 3D product on a display device. In this way, the 3D product and related color histogram can be remotely viewed.

At 624 the method includes automatically generating a 3D product search query based on the color histogram. Step 624 may also be implemented responsive to generation of the color histogram. A 3D product search query may include a query requesting data related to aspects of the color histogram, such as percentages of certain colors in the product's design, color of specified parts of the product, color combinations of the product's design, etc. For example, the product customized by a consumer may include a large amount of midnight blue. As such, the product search query may request related products with a similar amount of midnight blue or other related colors.

At 626 the method includes returning a 3D product search result based on the 3D product search query. In one example, returning the 3D product search results includes displaying an alternately-colored version of the 3D product or a plurality of alternatively-colored versions of the 3D product. The alternatively-colored versions of the 3D product provide the user with related customized product designs for comparison. This type of design comparison has the potential to inspire the user and boost their design creativity. Additionally, the alternately-colored versions of the 3D product may be returned based on each of the versions having a color histogram that correlate with the color histogram of the 3D product custom-colored by the user. The previously mentioned techniques for color histogram correlation may be used in this instance.

At 627 the method includes receiving the 3D product search result at the computing device. It will be appreciated that receiving the 3D product search result may include presenting the 3D product search results on a display device. Specifically, the 3D product search results may include the plurality of alternately-colored versions of the 3D product presented in a design gallery. For instance, a plurality of controllers with different designs having a common theme may be displayed in 3D product viewing gallery.

Moving to FIG. 7, the method includes at 628 generating a version selection input and sending the version selection input to the server, the version selection input specifying selection of one of the alternatively-colored versions of the 3D product. For example, a user may pick a 3D product design they have an affinity for in the gallery including the plurality of alternatively-colored versions of the 3D product.

Next at 630 the method includes receiving the version selection input at the server sent from the computing device. At 632 the method includes automatically generating a further 3D search query based on the color histogram of the selected alternatively-colored version of the 3D product.

At 634 the method includes returning a further 3D product search result based on the further 3D product search query. It will be appreciated that returning the further 3D product search query may include sending, receiving, and/or displaying the further 3D product search result. In this way, a product search can be further refined based on a user's selection of one of the multiple 3D product versions, enabling a user to steer the search in a desired direction.

Next at 636 the method includes receiving a keyword input from the user. For instance, the user may type a color they have an affinity for into a search bar, such as red, robot white, etc.

At 638 the method includes generating a 3D product search query based on the color histogram and the keyword input and at 640 the method includes sending the 3D product search query to the server. Next at 642 the method includes receiving the 3D product search query at the server.

At 644 the method includes returning a 3D product search result based on the product search query. Returning the 3D product search result may include steps 646-650. At 646 the method includes generating the 3D product search result based on the 3D product search query. As previously discussed, the 3D product search result can include one or more alternatively-colored versions of the 3D product. The alternatively-colored versions of the 3D product may be returned based on the keyword and having a color histogram that correlates with the color histogram of the 3D product. In this way, the keyword can be used to augment a search result, and/or to fine tune the search according to a user's personal predilections.

At 648 the method includes sending the 3D product search result to the computing device and at 650 the method includes receiving the 3D product search result.

Steps 652-660 enable a user to dynamically rotate the 3D product to thoroughly view all of the features of the 3D product. At 652 the method includes generating and sending a viewing angle change request to the server from the computing device. Next at 654 the method includes receiving the viewing angle change request at the server. At 656 the method includes rendering the 3D product with the requested viewing angle. It will be appreciated that the 3D product may be rendered using lighting models assigned to each part of the product. Proceeding to 658, the method includes sending the 3D product with the viewing angle change to the computing device.

Next at 660 the method includes receiving and displaying the 3D product with the viewing angle change. As such, the product can be viewed from a multitude of angles enabling consumers to fully view all of the aspects of the product.

Figure 8:
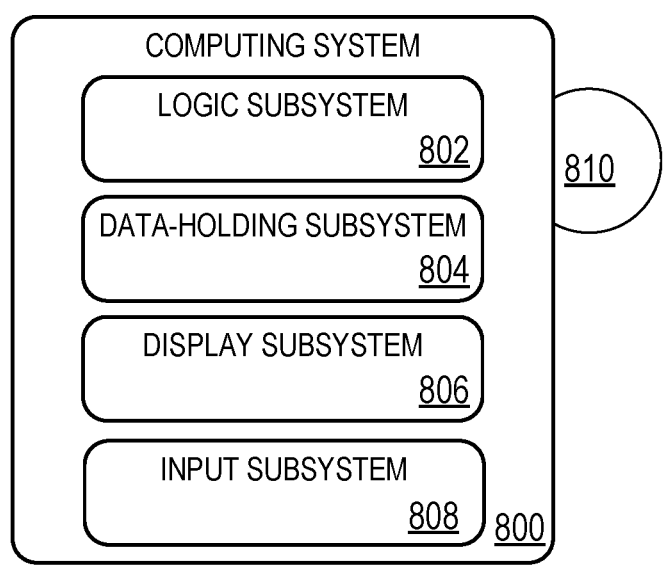
FIG. 8 shows another embodiment of a computing system for product color customization.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a data-holding subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Data-holding subsystem 804 includes one or more physical devices configured to hold instructions executable by the logic subsystem to implement the methods and processes described herein. When such methods and processes are implemented, the state of data-holding subsystem 804 may be transformed—e.g., to hold different data.

Data-holding subsystem 804 may include removable and/or built-in devices. Data-holding subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-holding subsystem 804 may include volatile, nonvolatile, dynamic, static, read/write, read-only, random-access, sequential-access, location-addressable, file-addressable, and/or content-addressable devices.

It will be appreciated that data-holding subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and data-holding subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by data-holding subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by data-holding subsystem 804. This visual representation may take the form of GUI. The term display used herein may refer to the act of presenting graphics in a GUI on a display screen or may simply refer to sending instructions for display to a display screen, in some instances. As the herein described methods and processes change the data held by the data-holding subsystem, and thus transform the state of the data-holding subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or data-holding subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The subject matter of the present disclosure is further described in the following paragraphs. According to one aspect, a computing system for managing product customization is provided. The computing system includes instructions stored in memory and executable by a processor to receive, for each of a plurality of parts of a 3D product, a color selection input specifying a color selected by a user for that part, responsive to receiving the color selection inputs, generate a color histogram of the 3D product including a plurality of units, each unit being associated with one of the parts and assigned the color of that part, where the number of units allocated to each part is based on a size of the part, and display the color histogram in a graphical user interface.

In this aspect, the instructions may be further executable to automatically generate a 3D product search query based on the color histogram, and return a 3D product search result based on the 3D product search query, such returning including display of an alternately-colored version of the 3D product, the alternately-colored version of the 3D product being returned based on it having a color histogram that correlates with the color histogram of the 3D product.

In this aspect, the instructions may be further executable to automatically generate a 3D product search query based on the color histogram; and return a 3D product search result based on the 3D product search query, such returning including display of multiple alternately-colored versions of the 3D product, each alternately-colored version of the 3D product being returned based on it having a color histogram that correlates with the color histogram of the 3D product.

In this aspect, the instructions may be further executable to receive a version selection input specifying selection of one of the alternately-colored versions of the 3D product, automatically generate a further 3D product search query based on the color histogram of the selected alternately-colored version of the 3D product, and return a further 3D product search result based on the further 3D product search query, such returning including display of one or more further alternately-colored versions of the 3D product.

In this aspect, In this aspect, the instructions may be further executable to receive a keyword input from the user, generate a 3D product search query based on the color histogram and the keyword, and return a 3D product search result based on the 3D product search query, such returning including display of one or more alternately-colored versions of the 3D product, the one or more alternately-colored versions of the 3D product being returned based on the keyword input and having a color histogram that correlates with the color histogram of the 3D product.

In this aspect, the size of the part may be expressed through a weighted surface area of the part.

In this aspect, the plurality of units in the color histogram may be linearly arranged.

In this aspect, the plurality of units may be arranged in the color histogram such that units with matching assigned colors are adjacent to one another.

In this aspect, the instructions may be further executable to display the 3D product adjacent to the color histogram in the graphical user interface.

In this aspect, displaying the 3D product may include applying a lighting model to each of the plurality of parts.

In this aspect, the lighting model of each part may correspond to a material of the part.

According to another aspect, a method for managing product customization is provided. The method includes at a server, receiving, for each of a plurality of parts of a 3D product, a color selection input specifying a color selected by a user for that part, responsive to receiving the color selection inputs, generating a color histogram of the 3D product including a plurality of units, each unit being associated with one of the parts and assigned the color of that part, where the number of units allocated to each part is based on a size of the part, and displaying the color histogram in a graphical user interface.

In this aspect, the method may further include automatically generating a 3D product search query based on the color histogram and returning a 3D product search result based on the 3D product search query, such returning including display of an alternately-colored version of the 3D product, the alternately-colored version of the 3D product being returned based on it having a color histogram that correlates with the color histogram of the 3D product.

In this aspect, the method may further include automatically generating a 3D product search query based on the color histogram and returning a 3D product search result based on the 3D product search query, such returning including display of multiple alternately-colored versions of the 3D product, each alternately-colored version of the 3D product being returned based on it having a color histogram that correlates with the color histogram of the 3D product.

In this aspect, the method may further include receiving a version selection input specifying selection of one of the alternately-colored versions of the 3D product, automatically generating a further 3D product search query based on the color histogram of the selected alternately-colored version of the 3D product, and returning a further 3D product search result based on the further 3D product search query, such returning including display of one or more further alternately-colored versions of the 3D product.

In this aspect, the method may further include displaying the 3D product adjacent to the color histogram in the graphical user interface.

In this aspect, the method may further include receiving a keyword input from the user, generating a 3D product search query based on the color histogram and the keyword input, and returning a 3D product search result based on the 3D product search query, such returning including display of one or more alternately-colored versions of the 3D product, the one or more alternately-colored versions of the 3D product being returned based on the keyword input and having a color histogram that correlates with the color histogram of the 3D product.

According to another aspect, a computing system for managing product customization is provided. The computing system includes instructions stored in memory and executable by a processor to receive, for each of a plurality of parts of a 3D product, a color selection input specifying a color selected by a user for that part, responsive to receiving the color selection inputs, generate a color histogram of the 3D product including a plurality of units, each unit being associated with one of the parts and assigned the color of that part, where the number of units allocated to each part is based on a size of the part, display the color histogram in a graphical user interface, automatically generate a 3D product search query based on the color histogram, and return a 3D product search result based on the 3D product search query, such returning including display of multiple alternately-colored versions of the 3D product, each alternately-colored version of the 3D product being returned based on it having a color histogram that correlates with the color histogram of the 3D product.

In this aspect, the instructions may be further executable to receive a version selection input specifying selection of one of the alternately-colored versions of the 3D product, automatically generate a further 3D product search query based on the color histogram of the selected alternately-colored version of the 3D product, and return a further 3D product search result based on the further 3D product search query, such returning including display of one or more further alternately-colored versions of the 3D product.

In this aspect, the instructions being further executable to receive a keyword input from the user, generate a 3D product search query based on the color histogram and the keyword, and return a 3D product search result based on the 3D product search query, such returning including display of one or more alternately-colored versions of the 3D product, the one or more alternately-colored versions of the 3D product being returned based on the keyword input and having a color histogram that correlates with the color histogram of the 3D product.

In some embodiments, the methods and processes described herein may be tied to a computing system of one or more computing devices. In particular, such methods and processes may be implemented as a computer-application program or service, an application-programming interface (API), a library, and/or other computer-program product.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing system for managing product customization, comprising:
   instructions stored in memory and executable by a processor to:
      receive, for each of a plurality of parts of a 3D product, a color selection input specifying a color selected by a user for that part;
      responsive to receiving the color selection inputs, display a rendered model of the 3D product with the selected colors specified by each of the color selection inputs in a graphical user interface;
      automatically generate a 3D product search query based on the color selection inputs;
      apply the 3D product search query to a database of alternately-colored versions of the 3D product;
      return a 3D product search result identifying at least one alternately-colored version of the 3D product based on the 3D product search query, the at least one alternately-colored version of the 3D product having a correlation above a correlation threshold with the color selection inputs for the 3D product; and
      display a rendered model of the at least one alternately-colored version of the 3D product in the graphical user interface.

2. The computing system of claim 1,
wherein the 3D product search result based on the 3D product search query identifies multiple alternately-colored versions of the 3D product, each alternately-colored version of the 3D product having a correlation above a correlation threshold with the color selection inputs for the 3D product; and wherein the instructions are further executed to display a rendered model of each of the multiple alternately-colored version of the 3D product in the graphical user interface.

3. The computing system of claim 2, the instructions being further executable to:
receive a version selection input specifying selection of one of the alternately-colored versions of the 3D product;
automatically generate a further 3D product search query based on the selected alternately-colored version of the 3D product; and
return a further 3D product search result based on the further 3D product search query; and display a rendered model of one or more further alternately-colored versions of the 3D product of the further 3D product search result in the graphical user interface.

4. The computing system of claim 1, the instructions being further executable to:
receive a keyword input from the user;
generate a 3D product search query based on the color selection inputs and the keyword; and
return a 3D product search result based on the 3D product search query, the 3D product search result identifying one or more alternately-colored versions of the 3D product having a correlation above a correlation threshold with the keyword and the color selection inputs for the 3D product; and
display a rendered model of the one or more alternatively-colored versions of the 3D product in the graphical user interface.

5. The computing system of claim 1, where displaying the 3D product includes applying a lighting model to each of the plurality of parts.

6. The computing system of claim 5, where the lighting model of each part corresponds to a material of the part.

7. The computing system of claim 1, wherein the instructions are further executable to:
display a color histogram of the 3D product based on the color selection inputs in the graphical user interface, the color histogram of the 3D product including a plurality of units, each unit being associated with one of the parts and assigned the color of that part, where the number of units allocated to each part is based on a size of the part.

8. The computing system of claim 7, where the size of the part is expressed through a weighted surface area of the part.

9. The computing system of claim 7, where the plurality of units in the color histogram are linearly arranged.

10. The computing system of claim 9, where the plurality of units are arranged in the color histogram such that units with matching assigned colors are adjacent to one another.

11. A method for managing product customization, comprising:
receiving, for each of a plurality of parts of a 3D product, a color selection input specifying a color selected by a user for that part;
responsive to receiving the color selection inputs,
displaying a rendered model of the 3D product with the selected colors specified by each of the color selection inputs in a graphical user interface;
automatically generating a 3D product search query based on the color selection inputs;
applying the 3D product search query to a database of alternately-colored versions of the 3D product;
returning a 3D product search result identifying at least one alternately-colored version of the 3D product based on the 3D product search query, the at least one alternately-colored version of the 3D product having a correlation above a correlation threshold with the color selection inputs for the 3D product; and
displaying a rendered model of the at least one alternately-colored version of the 3D product in the graphical user interface.

12. The method of claim 11, wherein the 3D product search query includes multiple alternately-colored versions of the 3D product, each alternately-colored version of the 3D product having a correlation above a correlation threshold with the color selection inputs for the 3D product; and
displaying a rendered model of each of the multiple alternately-colored versions of the 3D product in the graphical user interface.

13. The method of claim 12, further comprising:
receiving a version selection input specifying selection of one of the alternately-colored versions of the 3D product;
automatically generating a further 3D product search query based on the selected alternately-colored version of the 3D product;
returning a further 3D product search result based on the further 3D product search query; and displaying a rendered model of one or more further alternately-colored versions of the 3D product in the graphical user interface.

14. The method of claim 11, further comprising:
receiving a keyword input from the user;
generating a 3D product search query based on the color selection inputs and the keyword input; and
returning a 3D product search result based on the 3D product search query, the 3D product search result identifying one or more alternately-colored versions of the 3D product having a correlation above a correlation threshold with the keyword and the color selection inputs for the 3D product; and
displaying a rendered model of the one or more alternatively-colored versions of the 3D product in the graphical user interface.

15. A computing system for managing product customization, comprising:
instructions stored in memory and executable by a processor to:
receive, for each of a plurality of parts of a 3D product, a color selection input specifying a color selected by a user for that part;
responsive to receiving the color selection inputs, generate a color histogram of the 3D product including a plurality of units, each unit being associated with one of the parts and assigned the color of that part, where the number of units allocated to each part is based on a size of the part;
display the color histogram in a graphical user interface;
automatically generate a 3D product search query based on the color selection inputs;
return a 3D product search result based on the 3D product search query, the 3D product search result identifying multiple alternately-colored versions of the 3D product, each alternately-colored version of the 3D product having a correlation above a correlation threshold with the color selection inputs for the 3D product; and display a rendered model of each of the multiple alternatively-colored versions of the 3D product in the graphical user interface.

16. The computing system of claim 15, the instructions being further executable to:

receive a version selection input specifying selection of one of the alternately-colored versions of the 3D product;

automatically generate a further 3D product search query based on the selected alternately-colored version of the 3D product;

return a further 3D product search result based on the further 3D product search query, the 3D product search result identifying one or more further alternately-colored versions of the 3D product; and display a rendered model of the one or more further alternately-colored versions of the 3D product in the graphical user interface.

17. The computing system of claim 15, the instructions being further executable to:

receive a keyword input from the user;

generate a 3D product search query based on the color selection inputs and the keyword; and return a 3D product search result based on the 3D product search query, the 3D product search result identifying one or more alternatively-colored versions of the 3D product having a correlation above a correlation threshold with the keyword and the color selection inputs for the 3D product; and display a rendered model of the one or more alternatively-colored versions of the 3D product in the graphical user interface.

* * * * *